US012682295B2

(12) United States Patent
Maske et al.

(10) Patent No.: US 12,682,295 B2
(45) Date of Patent: Jul. 14, 2026

(54) SYSTEMS AND METHODS FOR CONTROLLING PALLETS IN A MANUFACTURING ENVIRONMENT USING REINFORCEMENT LEARNING

(71) Applicant: Ford Global Technologies, LLC, Dearborn, MI (US)

(72) Inventors: Harshal Maske, Farmington Hills, MI (US); Devesh Upadhyay, Canton, MI (US); Jim Birley, Bingham Farms, MI (US); Dimitar Petrov Filev, Novi, MI (US); Justin Miller, Berkley, MI (US); Robert Bennett, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1133 days.

(21) Appl. No.: 17/558,806

(22) Filed: Dec. 22, 2021

(65) Prior Publication Data

US 2023/0196217 A1     Jun. 22, 2023

(51) Int. Cl.
*G06F 18/21* (2023.01)
*G01C 21/00* (2006.01)
(Continued)

(52) U.S. Cl.
CPC ......... *G06Q 10/047* (2013.01); *G01C 21/005* (2013.01); *G06F 18/217* (2023.01); *G06Q 10/087* (2013.01)

(58) Field of Classification Search
CPC .............. G06Q 10/047; G06Q 10/087; G01C 21/3407; B65G 35/06; B65G 2201/0267; (Continued)

(56) References Cited

U.S. PATENT DOCUMENTS

| | | | |
|---|---|---|---|
| 2019/0135549 A1* | 5/2019 | Kilibarda | B62D 65/18 |
| 2020/0393820 A1 | 12/2020 | Lee et al. | |

(Continued)

FOREIGN PATENT DOCUMENTS

| | | |
|---|---|---|
| CN | 112149987 | 12/2020 |

OTHER PUBLICATIONS

Bai, Yan & You, Jeong-Bong & Lee, Il-Kyoo. (2021). Design and Optimization of Smart Factory Control System Based on Digital Twin System Model. Mathematical Problems in Engineering. Aug. 20, 2021. 1-16. 10.1155/2021/2596946. (Year: 2021).*

(Continued)

*Primary Examiner* — Ryan F Pitaro
*Assistant Examiner* — Jay Michael White
(74) *Attorney, Agent, or Firm* — Burris Law, PLLC

(57) ABSTRACT

A method includes obtaining sensor data from a plurality of sensors disposed at a plurality of routing control locations of an environment, where the sensor data is indicative of a number of a plurality of pallets at the plurality of routing control locations. The method includes calculating a plurality of difference values based on the sensor data, calculating a transient production value based on the sensor data and a transient objective function, and calculating a steady state production value based on the sensor data and a steady state objective function. The method includes generating a state vector based on the plurality of difference values, the transient production value, and the steady state production value, and defining a set of routes for a set of pallets from among the plurality of pallets based on the state vector and a digital twin of the environment.

20 Claims, 5 Drawing Sheets

(51) Int. Cl.
*G06Q 10/047* (2023.01)
*G06Q 10/087* (2023.01)
(58) Field of Classification Search
CPC ......... B62D 65/18; G06F 30/25; G06F 30/27;
G06F 30/28
See application file for complete search history.

(56) References Cited

U.S. PATENT DOCUMENTS

2021/0253352 A1    8/2021  Eckman et al.
2024/0094720 A1*   3/2024  Koyama ............. G05B 23/024

OTHER PUBLICATIONS

Hyunbo Cho, Richard A. Wysk, Intelligent workstation controller for computer integrated manufacturing: Problems and models, Journal of Manufacturing Systems, vol. 14, Issue 4, 1995, pp. 252-263, ISSN 0278-6125 (Year: 1995).*
Douglas G. Down, Mark E. Lewis, Dynamic load balancing in parallel queueing systems: Stability and optimal control, European Journal of Operational Research, vol. 168, Issue 2, 2006, pp. 509-519, ISSN 0377-2217 (Year: 2006).*
Park KT, Son YH, Ko SW, Noh SD. Digital Twin and Reinforcement Learning-Based Resilient Production Control for Micro Smart Factory. Applied Sciences. Mar. 26, 2021; 11(7):2977. https://doi.org/10.3390/app11072977 (Year: 2021).*
S. Y. Chen and Y. F. Li, "Automatic sensor placement for model-based robot vision," in IEEE Transactions on Systems, Man, and Cybernetics, Part B (Cybernetics), vol. 34, No. 1, pp. 393-408, Feb. 2004, doi: 10.1109/TSMCB.2003.817031. (Year: 2004).*
Guo, H., Zhu, Y., Zhang, Y. et al. A digital twin-based layout optimization method for discrete manufacturing workshop. Int J Adv Manuf Technol 112, 1307â1318, Jan. 2, 2021. (Year: 2021).*
Pereyra, EstefanÃ-a & AraguÃ¡s, GastÃ³n & Kulich, Miroslav. (2019). Path Planning for a Formation of Mobile Robots with Split and Merge. 10.48550/arXiv.1901.07408. (Year: 2019).*
Hao, Hu & Jia, Xiaoliang & He, Qixuan & Fu, Shifeng & Liu, Kuo. (2020). Deep reinforcement learning based AGVs real-time scheduling with mixed rule for flexible shop floor in industry 4.0. Computers & Industrial Engineering. (Year: 2020).*
Wang, Z., Schaul, T., Hessel, M., Hasselt, H., Lanctot, M. & Freitas, N.. (2016). Dueling Network Architectures for Deep Reinforcement Learning. <i>Proceedings of the 33rd International Conference on Machine Learning (Year: 2016).*
Yan, Chao & Xiaojia, Xiang & Wang, Chang. (2020). Towards Real-Time Path Planning through Deep Reinforcement Learning for a UAV in Dynamic Environments. Journal of Intelligent & Robotic Systems. (Year: 2020).*
S. Lang, F. Behrendt, N. Lanzerath, T. Reggelin and M. Müller, "Integration of Deep Reinforcement Learning and Discrete-Event Simulation for Real-Time Scheduling of a Flexible Job Shop Production, " 2020 Winter Simulation Conference (WSC), Orlando, Fl, USA, 2020, pp. 3057-3068 (Year: 2020).*
Park, et al., Digital Twin and Reinforcement Learning-Based Resilient Production Control for Micro Smart Factory, Applied Sciences, Mar. 26, 2021, 20 pages, vol. 11, 2977, MPDI, Switzerland.

* cited by examiner

SYSTEMS AND METHODS FOR CONTROLLING PALLETS IN A MANUFACTURING ENVIRONMENT USING REINFORCEMENT LEARNING

FIELD

The present disclosure relates to systems and methods for controlling pallets in a manufacturing environment using reinforcement learning.

BACKGROUND

The statements in this section merely provide background information related to the present disclosure and may not constitute prior art.

In a manufacturing environment, semi-finished and finished workpieces may be provided on various pallets that autonomously navigate between a plurality of workstations that perform manufacturing operations. As an example, when approaching or leaving a workstation, a controller may perform a neural network routine (e.g., a supervised learning technique, such as an image-based classification routine) to instruct the pallets to autonomously merge or split paths at various predefined locations in the environment. However, conventional neural network routines do not efficiently inhibit bottlenecks of a manufacturing routine to satisfy various time and production constraints of the manufacturing routine. These issues with conventional neural network routines that are configured to control pallets in a manufacturing environment, among other issues, are addressed by the present disclosure.

SUMMARY

This section provides a general summary of the disclosure and is not a comprehensive disclosure of its full scope or all of its features.

The present disclosure provides a method including obtaining sensor data from a plurality of sensors disposed at a plurality of routing control locations of an environment, where the sensor data is indicative of a number of a plurality of pallets at the plurality of routing control locations. The method includes calculating a plurality of difference values based on the sensor data, calculating a transient production value based on the sensor data and a transient objective function, and calculating a steady state production value based on the sensor data and a steady state objective function. The method includes generating a state vector based on the plurality of difference values, the transient production value, and the steady state production value, and defining a set of routes for a set of pallets from among the plurality of pallets based on the state vector and a digital twin of the environment.

In one form, the plurality of difference values corresponds to a difference between a first number of the plurality of pallets at a first routing control location from among the plurality of routing control locations and a second number of the plurality of pallets at a second routing control location from among the plurality of routing control locations. In one form, the method includes determining an action at each routing control location from among the plurality of routing control locations, where the action includes one of a pallet merging operation and a pallet splitting operation, and where the set of routes is further based on the action. In one form, the digital twin of the environment includes a plurality of trained routes associated with the plurality of pallets, and the method further comprises identifying a set of trained routes from among the plurality of trained routes based on the state vector and defining the set of routes based on the set of trained routes. In one form, the digital twin of the environment includes a plurality of trained routes associated with the plurality of pallets, and the method further comprises determining whether the set of routes correspond to a set of trained routes from among the plurality of trained routes and performing a corrective action in response to the set of routes not corresponding to the set of trained routes.

In one form, performing the corrective action includes broadcasting a notification indicating that a manufacturing routine associated with the set of routes does not satisfy a time criteria. In one form, the corrective action includes performing a reinforcement training routine configured to selectively adjust one or more reinforcement parameters of the digital twin. In one form, selectively adjusting the one or more reinforcement parameters includes adjusting a sensor layout of a plurality of virtual sensors corresponding to the plurality of sensors, adjusting the transient objective function, adjusting the steady state objective function, or a combination thereof. In one form, the transient objective function and the steady state objective function are based on a first target production value associated with a first type of pallets from among the plurality of pallets and a second target production value associated with a second type of pallets from among the plurality of pallets. In one form, the transient objective function is based on a first number of the first type of pallets and a second number of the second type of pallets located between a first routing control location and the consequent routing control location. In one form, the steady state objective function is based on a first number of the first type of pallets and a second number of the second type of pallets located passed through the consequent routing control location and a destination.

The present disclosure provides a system including a processor and a nontransitory computer-readable medium including instructions that are executable by the processor. The instructions include obtaining sensor data from a plurality of sensors disposed at a plurality of routing control locations of an environment, where the sensor data is indicative of a number of a plurality of pallets at the plurality of routing control locations, calculating a plurality of difference values based on the sensor data, calculating a transient production value based on the sensor data and a transient objective function, and calculating a steady state production value based on the sensor data and a steady state objective function. The instructions include generating a state vector based on the plurality of difference values, the transient production value, and the steady state production value, determining an action at each routing control location from among the plurality of routing control locations based on the state vector, where the action includes one of a pallet merging operation and a pallet splitting operation, and defining a set of routes for a set of pallets from among the plurality of pallets based on the action at each routing control location and a digital twin of the environment, where the digital twin of the environment includes a plurality of trained routes associated with the plurality of pallets. The instructions include determining whether the set of routes correspond to a set of trained routes from among the plurality of trained routes and performing a corrective action in response to the set of routes not corresponding to the set of trained routes.

In one form, the plurality of difference values corresponds to a difference between a first number of the plurality of pallets at a first routing control location from among the plurality of routing control locations and a second number of the plurality of pallets at a second routing control location from among the plurality of routing control locations. In one form, performing the corrective action includes broadcasting a notification indicating that a manufacturing routine associated with the set of routes does not satisfy a time criteria. In one form, the corrective action includes performing a reinforcement training routine configured to selectively adjust one or more reinforcement parameters of the digital twin. In one form, selectively adjusting the one or more reinforcement parameters includes adjusting a sensor layout of a plurality of virtual sensors corresponding to the plurality of sensors, adjusting the transient objective function, adjusting the steady state objective function, or a combination thereof.

The present disclosure provides a method including obtaining sensor data from a plurality of sensors disposed at a plurality of routing control locations of an environment, where the sensor data is indicative of a number of a plurality of pallets at the plurality of routing control locations, calculating a plurality of difference values based on the sensor data, calculating a transient production value based on the sensor data and a transient objective function, and calculating a steady state production value based on the sensor data and a steady state objective function. The method includes generating a state vector based on the plurality of difference values, the transient production value, and the steady state production value, determining an action at each routing control location from among the plurality of routing control locations based on the state vector, where the action includes one of a pallet merging operation and a pallet splitting operation, and defining a set of routes for a set of pallets from among the plurality of pallets based on the action at each routing control location and a digital twin of the environment, where the digital twin of the environment includes a plurality of trained routes associated with the plurality of pallets. The method includes determining whether the set of routes correspond to a set of trained routes from among the plurality of trained routes and performing a corrective action in response to the set of routes not corresponding to the set of trained routes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
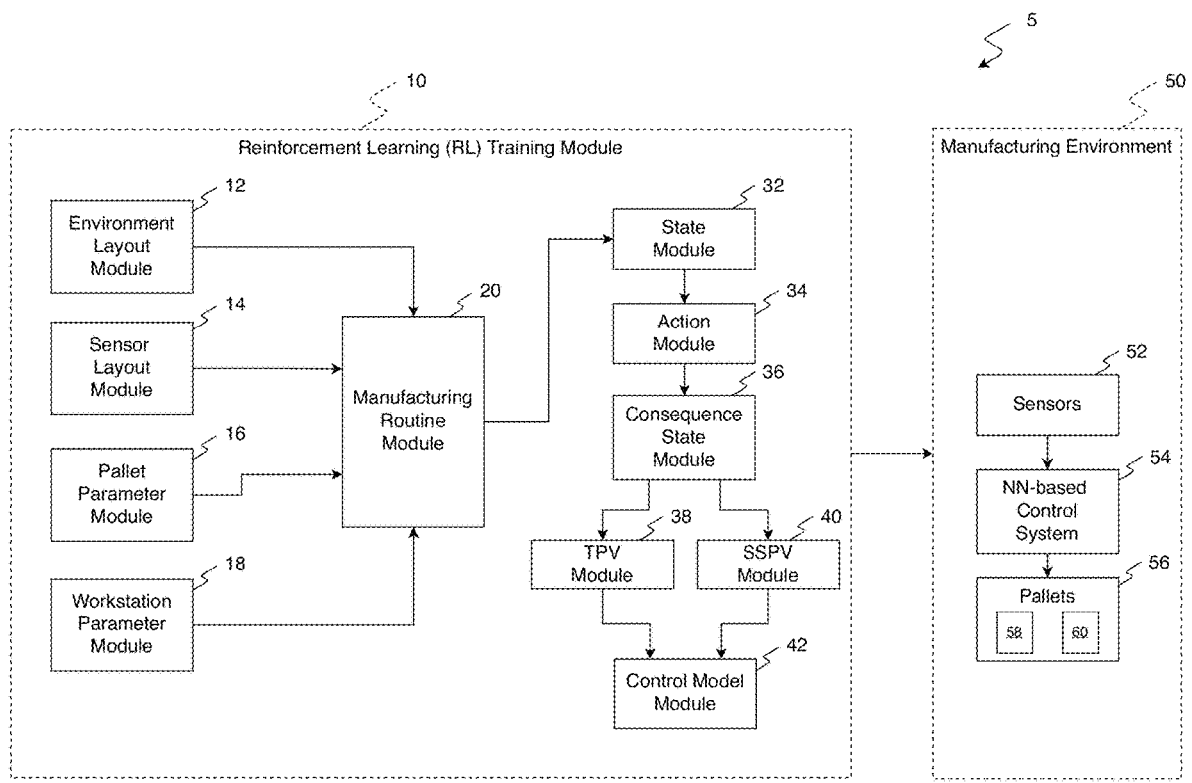
FIG. 1 is a block diagram of a system including a reinforcement learning training module and a manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for training a reinforcement learning system configured to control the autonomous movement of pallets in a manufacturing environment using a digital twin. A reinforcement learning training module simulates a manufacturing routine of a plurality of pallets and workstations and obtains state information from one or more sensors of the digital twin. The reinforcement learning training module determines an action at various routing control locations of the environment and based on the states at the routing control locations. The reinforcement learning training module calculates transient and steady state rewards based on the consequence states and one or more objective functions and selectively adjusts one or more reinforcement parameters of the reinforcement learning system based on the transient and steady state rewards. By selectively adjusting the reinforcement parameters, the reinforcement learning system can control the movement of the pallets between workstations and inhibit bottlenecks of the manufacturing routine and ensure various production conditions are satisfied.

The reinforcement learning system described herein also performs autonomous control of the movement of the pallets in the manufacturing environment when the reinforcement parameters are defined (i.e., the reinforcement learning system is trained). As an example, the reinforcement learning system obtains state information from the sensors of the manufacturing environment and identifies a previously trained route of the digital twin that is associated with the state information to reduce bottlenecks and satisfy time/production constraints. As another example, the reinforcement learning system obtains state information from the sensors of the manufacturing environment, generates a plurality of routes of the pallets based on the state information, compares calculated production constraint deviations to bottlenecks of the manufacturing environment, and selectively performs corrective actions based on the comparisons. Accordingly, the reinforcement learning system can dynamically detect deviations in the manufacturing environment associated with the pallets and/or workstations and dynamically update the digital twin to define the reinforcement parameters for the updated route.

Referring to FIG. 1, a system 5 for controlling and defining a sensor layout is provided and generally includes a reinforcement learning (RL) training module 10 and a manufacturing environment 50. While the RL training module 10 is positioned remotely from the manufacturing environment 50, it should be understood that the RL training module 10 may be included as part of the manufacturing environment 50 in other forms. In one form, the RL training module 10 and the manufacturing environment 50 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wide-band (UWB) protocol, among others).

In one form, the manufacturing environment 50 includes sensors 52, a neural-network-based (NN-based) control system 54, and pallets 56. In form, the sensors 52 are configured to obtain identification and/or location information associated with the pallets 56 and track the pallets 56 as they traverse the manufacturing environment 50. As an example, the sensors 52 may be radio frequency identification (RFID) scanners configured to scan RFID tags disposed on the pallets 56. As another example, the sensors 52 may be imaging devices (e.g., a two-dimensional (2D) camera or a three-dimensional (3D) camera) configured to obtain images of fiducial markers disposed on the pallets 56 (e.g., quick response (QR) tags that include a unique 2D barcode uniquely identifying the pallets 56). As described below in further detail, the RL training module 10 is configured to define the number and positioning of the sensors 52.

In one form, the pallets 56 are configured to transport raw, semi-finished, and finished workpieces between various workstations/storage areas of the manufacturing environment 50. The pallets 56 may be pallets that are moveable along headrails and conveyors, two-way entry pallets, four-way entry pallets, open deck pallets, solid deck pallets, and/or double face pallets. In one form, the pallets 56 may include fixtures 58 that are configured to support and secure a workpiece thereto.

In one form, the pallets 56 are partially or fully autonomous and are configured to move to various locations within the manufacturing environment 50, as instructed by the NN-based control system 54. To autonomously move itself, the pallets 56 include a control system 60 to control various movement systems (e.g., propulsion systems, steering systems, and/or brake systems) based on one or more navigation sensors (e.g., a global navigation satellite system (GNSS) sensor, an imaging sensor, a local position sensor, among others) of the pallets 56 (not shown). To perform the functionality described herein, the control system 60 may include one or more processor circuits that are configured to execute machine-readable instructions stored in one or more nontransitory computer-readable mediums, such as a random-access memory (RAM) circuit and/or read-only memory (ROM) circuit. The control system 60 may also include other components for performing the operations described herein, such as, but not limited to, movement drivers and systems, transceivers, routers, and/or input/output interface hardware. It should be understood that the pallets 56 may not be autonomous and thus be moveable by a forklift, vehicle, or conveyor/headrail of the manufacturing environment 50 in other forms.

In one form, the NN-based control system 54 is configured to instruct the pallets 56 to autonomously travel to various locations of the manufacturing environment 50 based on the sensor data obtained from the sensors 52 (i.e., the identification and/or location of the pallets 56). To perform the functionality described herein, the NN-based control system 54 may perform a deep reinforcement learning (DRL) routine. Additional details regarding the functionality of the NN-based control system 54 are provided below with reference to FIG. 4.

In one form, the NN-based control system 54 is trained based on actions performed by the agents and a reward associated with the action (e.g., whether the various actions satisfy one or more time/production constraints associated with the manufacturing routine). Furthermore, to train the NN-based control system 54 (e.g., maximize the rewards of the DRL learning routine), the RL training module 10 may iteratively modify various reinforcement parameters of the RL training module 10. Additional details regarding training the NN-based control system 54 are provided below.

In one form, the RL training module 10 includes an environment layout module 12, a sensor layout module 14, a pallet parameter module 16, a workstation parameter module 18, a manufacturing routine module 20, and a control model module 42. It should be readily understood that any one of the components of the RL training module 10 can be provided at the same location or distributed at different locations (e.g., via one or more edge computing devices) and communicably coupled accordingly. To perform the functionality described herein, the RL training module 10 may include a human-machine-interface (HMI) (e.g., a touchscreen display, monitor, among others) and/or input devices (e.g., mouse, keyboard, among others) that enable an operator to generate inputs corresponding to the described functionality.

In one form, the environment layout module 12 is configured to generate a digital twin of the manufacturing environment 50. As used herein, a "digital twin" may refer to a virtual representation of various components and systems of the manufacturing environment 50, such as one or more workstations (not shown), the pallets 56, the sensors 52, among other components and systems. The virtual representation may be, for example, a dynamic simulation model of the manufacturing environment 50 (e.g., a discrete event simulation of the manufacturing environment 50). As described below in further detail, the virtual representation may also include historical operation data associated with the components and systems of the manufacturing environment 50 when a manufacturing routine is being simulated by the manufacturing routine module 20.

In one form, the environment layout module 12 is configured to define one or more routing control locations of the digital twin. As used herein, "routing control locations" refer to locations within the digital twin in which virtual pallets perform a pallet merging operation and/or a pallet splitting operation. As used herein, "pallet merging operation" refers to an operation in which one or more first virtual pallets traveling along a first path and one or more additional virtual pallets traveling along one or more additional paths are merged such that at least a set of the first virtual pallets and a set of the additional virtual pallets travel along a new path. As used herein, "pallet splitting operation" refers to an operation in which a plurality of virtual pallets traveling along a path are split such that a first set of the plurality of pallets travels along a first new path and a second set of the plurality of pallets travels along a second new path.

Figure 2:
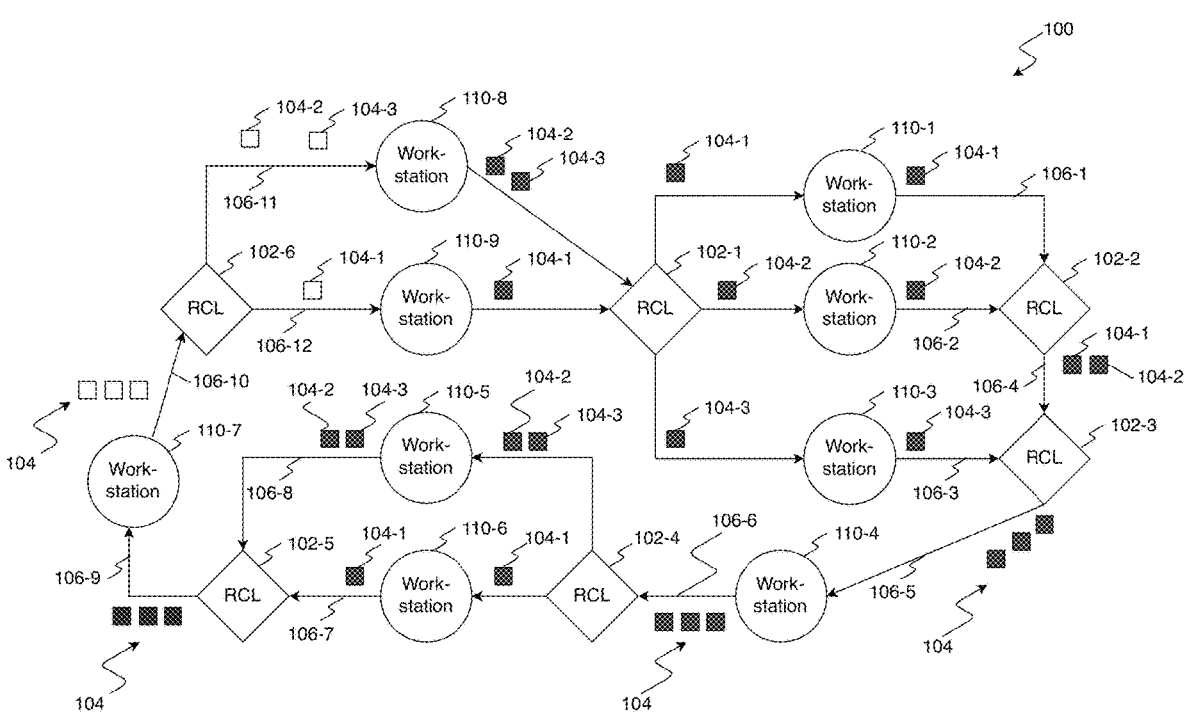
FIG. 2 is a block diagram of a digital twin of a manufacturing environment in accordance with the teachings of the present disclosure.

As an example and referring to FIG. 2, which illustrates a digital twin 100 of the manufacturing environment 50, the environment layout module 12 defines routing control locations 102-1, 102-2, 102-3, 102-4, 102-5, 102-6 (collectively referred to as "routing control locations 102") at which a pallet merging operation and/or pallet splitting operation can be performed. Specifically, a pallet merging operation can be performed at the routing control locations 102-1, 102-2, 102-3, 102-5. For example, pallets 104-1, 104-2 traveling along paths 106-1, 106-2 can be merged at the routing control location 102-2 such that the pallets 104-1, 104-2 travel along path 106-4. Furthermore, a pallet splitting operation can be performed at the routing control locations 102-1, 102-4, 102-6. For example, pallets 104-1, 104-2, 104-3 traveling along paths 106-11, 106-12 can be split at the routing control location 102-1 such that the pallets 104-1, 104-2, 104-3 travel along paths 106-1, 106-2, 106-3, respectively. Additionally, both a pallet merging operation and a pallet splitting operation can be performed at the routing control location 102-1. The pallets 104-1, 104-2, 104-3 may be collectively referred to herein as "pallets 104," and paths 106-1, 106-2, 106-3, 106-4, 106-5, 106-6, 106-7, 106-8, 106-9, 106-10, 106-11, 106-12 may be collectively referred to herein as "paths 106."

Figure 3:
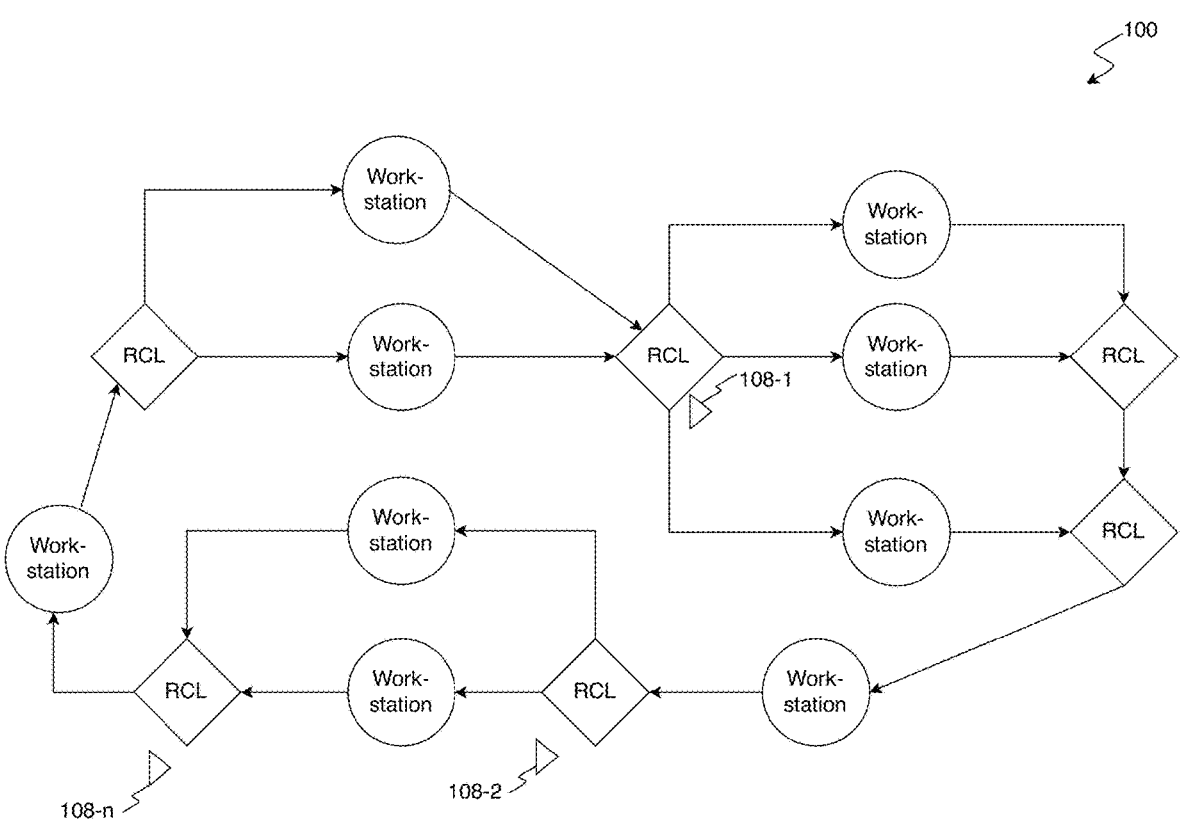
FIG. 3 is a block diagram of a digital twin of a sensor layout of a manufacturing environment in accordance with the teachings of the present disclosure.

In one form and referring to FIGS. 1 and 3, the sensor layout module 14 is configured to define a sensor layout including one or more sensors 108-1, 108-2, . . . 108-$n$ (collectively referred to hereinafter as "sensors 108") of the digital twin 100 based on one or more sensor parameters. In one form, the sensor parameters include a predetermined number of sensors (e.g., a minimum and maximum number of sensors 108 in accordance with resource-based constraints), a type of sensor, sensor placement rules (e.g., the sensors 108 can only be placed at the routing control locations 102), and/or feedback information. As an example, the sensor layout module 14 initially defines the sensor layout such that the minimum number of sensors 108 are placed at one or more of the routing control locations 102 (e.g., the routing control locations 102-1, 102-2, 102-3, 102-4 represent the minimum of sensor locations of the digital twin 100).

In one form, the pallet parameter module 16 is configured to define one or more pallet parameters associated with the pallets 104. The one or more pallet parameters may include a pallet merging time associated with each routing control location 102, a pallet splitting time associated with each routing control location 102, and/or pallet travel times between the routing control locations 102. As used herein, "pallet merging time" refers to an amount of time needed to perform the pallet merging operation, and "pallet splitting time" refers to an amount of time needed to perform the pallet splitting operation. As used herein, "pallet travel time" refers to an amount of time needed for the pallet 104 to travel between a pair of routing control locations 102.

In one form, the workstation parameter module 18 is configured to define one or more workstations 110-1, 110-2, 110-3, 110-4, 110-5, 110-6, 110-7, 110-8, 110-9 (collectively referred to hereinafter as "workstations 110") of the digital twin 100 and one or more workstation parameters associated with the workstations 110. The one or more workstation parameters may include a cycle time and/or downtime associated with each workstation 110. In one form, the cycle time and/or downtime are arbitrarily or stochastically defined by an operator or defined based on empirical/historical cycle time/downtime data associated with the workstations of the manufacturing environment 50. Additionally, the one or more workstation parameters may include a type of workstation 110, a manufacturing operation performed at the workstation 110 (e.g., a pallet loading/unloading operation, a workpiece transformation operation, among others), robot parameters/mobility characteristics associated with one or more robots located at the workstation 110, conveyor/fixture operational characteristics, among other workstation parameters. As an example, the workstation parameters may indicate that a pallet unloading operation is performed at the workstation 110-7, a pallet loading operation is performed at the workstations 110-8, 110-9, and a workpiece transformation operation is performed at the remaining workstations 110-1, 110-2, 110-3, 110-4, 110-5, 110-6.

In one form, the manufacturing routine module 20 is configured to simulate a manufacturing routine of the pallets 104 and the workstations 110 based on the sensor layout of the sensors 108, the one or more pallet parameters, and the one or more workstation parameters. As an example, the manufacturing routine module 20 simulates the pallets 104 traversing from the routing control location 102-1 to a given destination, such as the workstation 110-7 (e.g., a storage location where the finished workpieces of the pallets 104 are unloaded) or the workstations 110-8, 110-9 (e.g., a storage location where unloaded pallets 104 are loaded with workpieces) via the one or more of the paths 106, one or more of the workstations 110, and one or more additional routing control locations 102 where the pallet merging/splitting operations are performed. In some forms, the manufacturing routine module 20 may perform known manufacturing simulation routines to simulate the manufacturing routine of the pallets 104 and the workstations 110.

In one form, the RL training module 10 includes a state module 32, an action module 34, a consequence state module 36, a transient production value (TPV) module 38, a steady state production value (SSPV) module 40, and a control model module 42. In one form, the state module 32, the action module 34, and the consequence state module 36 are collectively configured to perform a discrete-time stochastic control routine, such as a Markov decision process (MDP) routine.

In one form, the state module 32 is configured to obtain state information from the sensors 108 during the manufacturing simulation routine. The state information includes a number and/or type of pallets at the routing control locations 102 at one or more times of the manufacturing simulation routine. As an example, the state information indicates a discrete time value (T) of the manufacturing simulation, the routing control location 102, a number of pallets 104 that are classified as the first type ($x_1$) and a number of pallets 104 that are classified as the second type ($x_2$), as shown below in Table 1.

TABLE 1

| State Information - Routing Control Location 102-2 | | |
| --- | --- | --- |
| Time | $x_1$ | $x_2$ |
| $T_0$ | 1 | 0 |
| $T_1$ | 1 | 1 |
| $T_2$ | 2 | 1 |

In one form, the action module 34 is configured to determine an action at the routing control locations 102 based on the state information. The actions include, for example, the pallet merging operation and the pallet splitting operation. In one form, the actions may be determined at each of the discrete time values, as shown below in Table 2.

TABLE 2

| Action - Routing Control Location 102-2 | |
| --- | --- |
| Time | Action |
| $T_0$ | Select and Merge Pallet 104-2 ($x_2$) |
| $T_1$ | Select and Merge Pallet 104-1 ($x_1$) |
| $T_2$ | Select and Merge Pallet 104-1 ($x_1$) |

In one form, the consequence state module 36 is configured to determine a consequence state at the routing control locations 102 based on the action. In one form, the consequence state information includes a number and/or type of pallets at the routing control locations 102 at the one or more times of the manufacturing simulation routine. As an example, the consequence state information indicates a consequent routing control location 102 associated with the action, a number of pallets 104 at the consequent routing control location 102 that are classified as the first type ($x_1'$) and a number of pallets 104 at the consequent routing control location 102 that are classified as the second type ($x_2'$), as shown below in Table 3.

TABLE 3

| Consequence State - Routing Control Location 102-2 | | |
|---|---|---|
| Time | $x_1'$ | $x_2'$ |
| $T_0$ | 1 | 1 |
| $T_1$ | 2 | 1 |
| $T_2$ | 3 | 1 |

While Tables 1-3 illustrate the state information, action, and consequence state for the routing control location 102-2, it should be understood that tables illustrating the state information, action, and consequence state may be generated for each routing control location 102.

In one form, the TPV module 38 is configured to calculate a TPV of each routing control location 102 based on the consequence state and a transient objective function. The TPV corresponds to transient rewards of the simulated manufacturing routine at the given routing control location 102. In one form, when more than two types of pallets 104 exist (e.g., the pallets 104 can travel along n paths 106 to arrive at one of the routing control locations 102, where n>2), the TPV module 38 calculates the TPV for the routing control location 102 based on the following transient objective function:

$$TPV_{102} = -\left| \frac{d_1}{d_1 + d_2 + \dots d_n} - \frac{x_{1'}}{x_{1'} + x_{2'} + \dots x_{n'}} \right| \quad (1)$$

In transient objective function (1), $d_1$ is a first target production value associated with a first type of pallets 104, $d_2$ is a second target production value associated with a second type of pallets 104, and $d_n$ is an nth target production value associated with an nth type of pallets 104. The first, second, and nth target production values collectively form a production ratio that is based on the first production ratio and a sum of the first, second, and nth production ratios. As used herein, "target production value" refers to a number of pallets 104 of the given type that need to traverse from a defined origin (e.g., the routing control location 102-2) and the destination (e.g., the workstation 110-7) along the paths 106 to satisfy predefined time and/or production-based constraints.

In transient objective function (1) and as described above, $x_1'$ is the number of pallets 104 between the consequent routing control location 102 and the destination that are classified as the first type, $x_2'$ is the number of pallets 104 between the consequent routing control location 102 and the destination that are classified as the second type, and $x_n'$ is the number of pallets 104 between the consequent routing control location 102 and the destination that are classified as the nth type. Furthermore, in transient objective function (1), the numbers of the first and second types of pallets 104 ($x_1$ and $x_2$) collectively form a transient routing control location ratio that is based on the number of pallets 104 that are classified as the first type of pallets 104 ($x_1$) and a sum of the number of the first and second types of pallets 104. Furthermore, in transient objective function (1), the numbers of the first, second, and nth types of pallets 104 collectively form a transient routing control location ratio that is based on the number of pallets 104 that are classified as the first type of pallets 104 ($x_1$) and a sum of the number of the first, second, and nth types of pallets 104.

In one form, the SSPV module 40 is configured to calculate a SSPV of each routing control location 102 based on the consequence state and a steady state objective function. The SSPV corresponds to steady state rewards of the simulated manufacturing routine at the given routing control location and is represented as an objective function. In one form, when more than two types of pallets 104 exist (e.g., the pallets 104 can travel along n paths 106 to arrive at one of the routing control locations 102, where n>2), the SSPV module 40 calculates the SSPV for the routing control location 102 based on the following steady state objective function:

$$SSPV_{102} = -\left| \frac{d_1}{d_1 + d_2 + \dots d_n} - \frac{c_1}{c_1 + c_2 + \dots c_n} \right| \quad (2)$$

In steady state objective function (2), $c_1$ is a number of pallets 104 that are classified as the first type of pallets 104 that have passed through the given routing control location 102, $c_2$ is a number of pallets 104 that are classified as the second type of pallets 104 that have passed through the given routing control location 102, and $c_n$ is a number of pallets 104 that are classified as the nth type of pallets 104 that have passed through the given routing control location 102. Furthermore, in steady state objective function (2), the numbers of the first, second, and nth types of pallets 104 collectively form a steady state routing control location ratio that is based on the number of pallets 104 that are classified as the first type of pallets 104 ($c_1$) and a sum of the number of the first, second, and nth types of pallets 104.

In one form, the control model module 42 is configured to selectively adjust one or more reinforcement parameters of the RL training module 10 based on the TPV and/or the SSPV. As an example, the control model module 42 is configured to determine whether the TPV and SSPV are less than a respective threshold value (i.e., a threshold TPV and a threshold SSPV). The threshold values for the TPV and SSPV may be equal or unequal. In one form, the threshold value for each of the TPV and the SSPV may be equal to (or approximately equal to) zero. Accordingly, comparing the TPV and the SSPV to the respective threshold enables the RL training module 10 to determine whether the reinforcement parameters of the RL training module 10 satisfy certain predefined production constraints.

In one form, when the control model module 42 determines that the TPV and/or the SSPV are greater than the respective threshold value, the control model module 42 is configured to adjust one or more reinforcement parameters of the RL training module 10. The reinforcement parameters include, but are not limited to, the state information, the action, the sensor layout of the one or more sensors 108, the transient objective function, and/or the steady state objective function. The control model module 42 may iteratively adjust the reinforcement parameters until the TPV and the SSPV are less than the respective threshold values.

As an example, the control model module 42 is configured to iteratively adjust the sensor layout of the digital twin 100 (i.e., the number of sensors 108 and/or the placement of the sensors 108) until each TPV is less than or equal to a threshold TPV and each SSPV is less than or equal to the threshold SSPV. As an additional example, the sensor layout includes a predefined minimum number of the sensors 108, and the sensor layout is adjusted by adding one or more sensors 108 until a predefined maximum number of sensors 108 is reached. As another example, the control model module 42 is configured to adjust the threshold values of the transient objective function and/or the steady state objective function when the updated sensor layouts, state information, and/or action do not satisfy the time and/or production-based constraints associated with the transient and steady state objective functions.

As an additional example, the control model module 42 is configured to adjust the state information when the sensor layout is adjusted by adjusting the number and/or types of pallets 104 provided at one or more of the routing control locations 102 (e.g., the control model module 42 may increase or decrease the number and pathways in which the pallets 104 arrive and depart from the routing control location 102-1). As yet another example, the control model module 42 is configured to adjust the action performed by at least one of the pallets 104 at one or more of the routing control locations 102.

In one form, the control model module 42 determines that the NN-based control system 54 is trained when the TPV and/or the SSPV are less than the respective threshold value. When the control model module 42 determines that the NN-based control system 54 is trained, the control model module 42 may generate a state-action information correlation model (e.g., a deep neural network model) indicating, for each routing control location 102, an action associated with various state information. As an example, and as shown below in Table 4, a state-action information correlation model for the routing control location 102-2 is shown. While various actions are shown for given example sets of state information, it should be understood that other sets of state information and actions may be included and are not limited to the examples provided in Table 4.

TABLE 4

| State-action Information Correlation Model - Routing Control Location 102-2 | | |
|---|---|---|
| State | | |
| $x_1$ | $x_2$ | Action |
| 1 | 0 | Pallet Merging Operation (PMO) from $X_2$ |
| 1 | 1 | PMO from $X_1$ |
| 2 | 1 | PMO from $X_1$ |

In one form, the control model module 42 is configured to define a plurality of trained routes of the pallets 104 based on the state-action information correlation model of each routing control location 102. Specifically, the control model module 42 is configured to define the trained routes based on the state and action information defined in the state-action information correlation model of each routing control location 102. As an example, the control model module 42 identifies a first action associated with a first set of state information of routing control location 102-1, a second action associated with a second set of state information of routing control location 102-2, and additional actions associated with additional routing control locations 102 based on the state-action information correlation models. As such, the control model module 42 defines the route based on a path of a given pallet 104 associated with the first action, the second action, and the additional actions. It should be understood that the control model module 42 may define a trained route for each combination of state information/actions of the state-action information correlation models.

Figure 4:
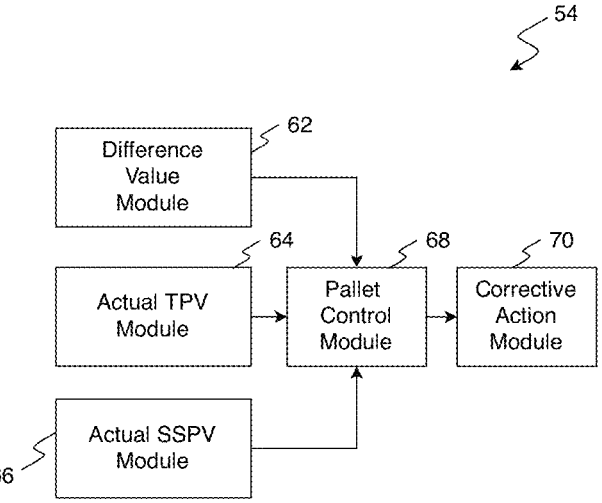
FIG. 4 is a block diagram of a reinforcement learning system in accordance with the teachings of the present disclosure.

Referring to FIG. 4, the NN-based control system 54 is configured to perform a DRL routine to instruct the pallets 56 to autonomously travel to various locations of the manufacturing environment 50 when the NN-based control system 54 is trained by the RL training module 10. Moreover, the agents of the DRL routine are provided by the pallets 56, and the states of the DRL routine are provided by the location information of the pallets 56 as determined by the sensors 52 of the manufacturing environment 50. In one form, the NN-based control system 54 includes a difference value module 62, an actual TPV module 64, an actual SSPV module 66, a pallet control module 68, and a corrective action module 70. It should be readily understood that any one of the components of the NN-based control system 54 can be provided at the same location or distributed at different locations (e.g., via one or more edge computing devices) and communicably coupled accordingly.

In one form, the difference value module 62 is configured to obtain sensor data from the sensors 52 that are disposed at the routing control locations of the manufacturing environment 50. The sensor data may be indicative of the number of pallets 56 at the routing control locations of the manufacturing environment 50 (i.e., the state information of the manufacturing environment 50). Furthermore, the difference value module 62 is configured to calculate a plurality of difference values based on the sensor data. As used herein, the "difference value" refers to a difference between a number of pallets 56 detected between a pair of routing control locations of the manufacturing environment 50. As an example, a first difference value may correspond to a difference between a number of pallets 56 at a first routing control location and a second routing control location of the manufacturing environment 50, a second difference value may correspond to a difference between a number of pallets 56 at the second routing control location and a third routing control location of the manufacturing environment 50, and so on. It should be understood that the difference value module 62 may calculate a difference value between various sequential or nonsequential pairs of routing control locations of the manufacturing environment 50.

In one form, the actual TPV module 64 is configured to calculate a TPV value for each routing control location of the manufacturing environment 50 based on the sensor data and a transient objective function. The TPV value calculated by the actual TPV module 64 corresponds to a transient reward of the manufacturing routine being performed by the workstations of the manufacturing environment 50 (which correspond to the workstations 110 of the digital twin 100) and the plurality of pallets 56. In one form, the actual TPV module 64 calculates the TPV using a transient objective function that is similar to transient objective function (1) described above.

In one form, the actual SSPV module 66 is configured to calculate an SSPV value for each routing control location of the manufacturing environment 50 based on the sensor data and a steady state objective function. The SSPV value calculated by the actual SSPV module 66 corresponds to a steady state reward of the manufacturing routine being performed by the workstations of the manufacturing environment 50 and the plurality of pallets 56. In one form, the actual SSPV module 66 calculates the SSPV using a transient objective function that is similar to steady state objective function (2) described above.

In one form, the pallet control module 68 is configured to generate a state vector based on the plurality of difference values, the TPV calculated by the actual TPV module 64, and the SSPV calculated by the actual SSPV module 66. In one form, the state vector may further include information related to previous outputs generated by the pallet control module 68 and/or the corrective action module 70.

The pallet control module 68 is configured to determine an action at each routing control location of the manufacturing environment 50 and a route of the pallets 56 based on the actions at each routing control location. As an example, the pallet control module 68 identifies the state information, actions, and trained routes from the state-action information correlation models of each routing control location 102 of the digital twin 100 based on the state vector and defines the route of the pallets 56 to match the corresponding trained routes of the digital twin 100. Accordingly, the pallet control module 68 may control the pallets 56 to autonomously travel within the manufacturing environment 50 along a set of routes associated with previously defined and trained routes that inhibit bottlenecks and satisfy various predetermined time and production constraints.

As another example, the pallet control module 68 determines whether the TPV and SSPV values of the state vector are less than a threshold value and dynamically adjusts the actions at upcoming routing control locations of the manufacturing environment 50 until the TPV and SSPV values are less than the threshold. When the TPV and SSPV values are less than the threshold, the pallet control module 68 defines the corresponding set of routes based on the selectively adjusted actions, and the corrective action module 70 determines whether the dynamically defined routes correspond to a set of trained routes of the digital twin 100. If the dynamically defined routes do not correspond to the set of trained routes, the corrective action module 70 may perform a corrective action. Example corrective actions include, but are not limited to, broadcasting a notification indicating that a manufacturing routine associated with the set of routes does not satisfy a time criteria, instructing the RL training module 10 to initiate a corresponding simulation of the manufacturing routine of the digital twin 100 and define the corresponding reinforcement parameters, among others. Accordingly, the pallet control module 68 and corrective action module 70 may identify deviations from expected time/production constraints associated with the manufacturing routine, dynamically generate routes for the pallets 56 when the trained routes are not provided by the digital twin 100, and/or dynamically update the digital twin 100 by generating new trained routes associated with the deviations.

Figure 5:
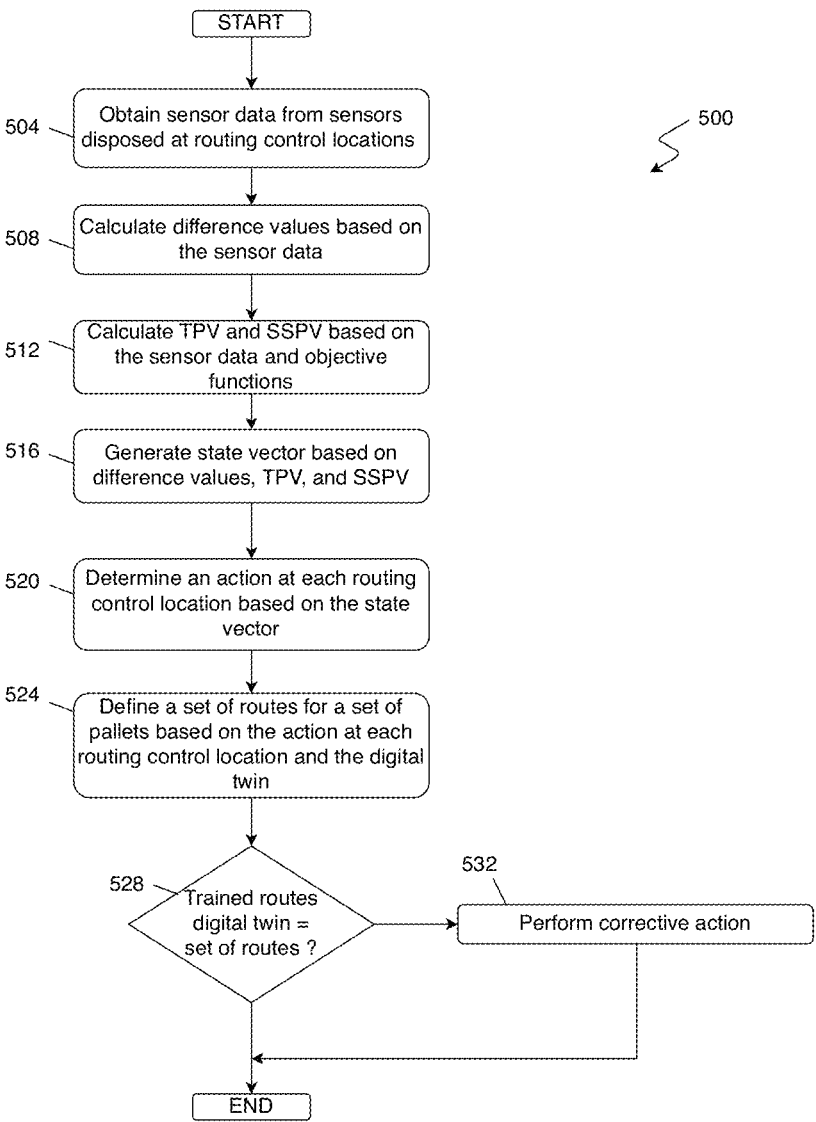
FIG. 5 illustrates a routine for controlling a plurality of pallets using a reinforcement learning system in accordance with the teachings of the present disclosure.

Referring to FIG. 5, a routine 500 controlling the pallets 56 using the NN-based control system 54 is shown. At 504, the NN-based control system 54 obtains sensor data from the sensors 52 disposed at the routing control locations of the manufacturing environment 50. At 508, the NN-based control system 54 calculates the plurality of difference values based on the sensor data, and the NN-based control system 54 calculates the TPV and SSPV based on the sensor data and the objective functions at 512. At 516, the NN-based control system 54 generates the state vector based on the difference values, the TPV, and the SSPV, and the NN-based control system 54 defines a set of routes based on the state vector and/or the digital twin 100. At 524, the NN-based control system 54 determines whether the set of trained routes of the digital twin 100 correspond to the set of routes generated at 520. If the routes do not correspond to the set of trained routes, the routine 500 proceeds to 528, where the NN-based control system 54 performs a corrective action. The routine 500 then ends. It should be understood that routine 500 is just an example routine and that the NN-based control system 54 may perform other routines in other forms.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

obtaining sensor data from a plurality of sensors disposed at a plurality of routing control locations of an environment, wherein the sensor data is indicative of a number of a plurality of pallets at the plurality of routing control locations;

calculating a plurality of difference values based on the sensor data;

calculating a transient production value based on the sensor data and a transient objective function;

calculating a steady state production value based on the sensor data and a steady state objective function;

generating, using a reinforcement learning system including a neural network, wherein the neural network comprises a dueling network architecture that separately learns state values and action advantages, a state vector by combining the plurality of difference values, the transient production value, and the steady state production value into a unified vector representation that is used by the reinforcement learning system to select actions that optimize both transient and steady-state manufacturing objectives simultaneously based on the plurality of difference values, the transient production value, and the steady state production value;

defining, using the reinforcement learning system, a set of routes for a set of pallets from among the plurality of pallets based on the state vector and a digital twin of the environment, wherein the digital twin performs discrete event simulation synchronized with real-time sensor data to generate virtual event traces for training, wherein the digital twin of the environment includes a plurality of trained routes that are trained by the reinforcement learning system; and controlling, using the reinforcement learning system, an autonomous movement of the set of pallets based on a real-time comparison between dynamically generated routes and the plurality of trained routes to prevent bottlenecks in the environment.

2. The method of claim 1, wherein the plurality of difference values corresponds to a difference between a first number of the plurality of pallets at a first routing control location from among the plurality of routing control locations and a second number of the plurality of pallets at a second routing control location from among the plurality of routing control locations.

3. The method of claim 1 further comprising determining an action at each routing control location from among the plurality of routing control locations, wherein the action includes one of a pallet merging operation and a pallet splitting operation, and wherein the set of routes is further based on the action.

4. The method of claim 1, wherein the method further comprises:

identifying a set of trained routes from among the plurality of trained routes based on the state vector; and defining the set of routes based on the set of trained routes.

5. The method of claim 1, wherein the method further comprises:

determining whether the set of routes correspond to a set of trained routes from among the plurality of trained routes; and performing a corrective action in response to the set of routes not corresponding to the set of trained routes.

6. The method of claim 5, wherein performing the corrective action includes broadcasting a notification indicating that a manufacturing routine that utilizes the set of routes for pallet movement does not satisfy a time criterion.

7. The method of claim 5, wherein the corrective action includes performing a reinforcement training routine configured to selectively adjust one or more reinforcement parameters of the digital twin.

8. The method of claim 7, wherein selectively adjusting the one or more reinforcement parameters includes adjusting a sensor layout of a plurality of virtual sensors corresponding to the plurality of sensors, adjusting the transient objective function, adjusting the steady state objective function, or a combination thereof.

9. The method of claim 1, wherein the transient objective function and the steady state objective function are based on a first target production value for a first type of pallets from among the plurality of pallets and a second target production value for a second type of pallets from among the plurality of pallets.

10. The method of claim 9, wherein the transient objective function is based on a first number of the first type of pallets and a second number of the second type of pallets located between a first routing control location and a consequent routing control location.

11. The method of claim 9, wherein the steady state objective function is based on a first number of the first type of pallets and a second number of the second type of pallets located between a consequent routing subsequent routing control location downstream from the first routing control location and a destination.

12. A system comprising:

a processor; and a nontransitory computer-readable medium including instructions that are executable by the processor, wherein the instructions include:

obtaining sensor data from a plurality of sensors disposed at a plurality of routing control locations of an environment, wherein the sensor data is indicative of a number of a plurality of pallets at the plurality of routing control locations;

calculating a plurality of difference values based on the sensor data;

calculating a transient production value based on the sensor data and a transient objective function;

calculating a steady state production value based on the sensor data and a steady state objective function, wherein the transient objective function and the steady state objective function are based on a first target production value and a second target production value, wherein the first target production value is a first number of a first type of pallets from among the plurality of pallets that traverse between two locations of the environment to satisfy a constraint, and the second target production value is a second number of a second type of pallets from among the plurality of pallets that traverse between the two locations to satisfy the constraint;

generating a state vector by combining the plurality of difference values, the transient production value, and the steady state production value into a unified vector representation that is used by a reinforcement learning system to select actions that optimize both transient and steady-state manufacturing objectives simultaneously based on the plurality of difference values, the transient production value, and the steady state production value;

determining an action at each routing control location from among the plurality of routing control locations based on the state vector, wherein the action includes one of a pallet merging operation and a pallet splitting operation;

defining, using the reinforcement learning system including a neural network, wherein the neural network comprises a dueling network architecture that separately learns state values and action advantages, a set of routes for a set of pallets from among the plurality of pallets based on the action at each routing control location and a digital twin of the environment, wherein the digital twin performs discrete event simulation synchronized with real-time sensor data to generate virtual event traces for training, wherein the digital twin of the environment includes a plurality of trained routes for controlling movement of the plurality of pallets;

determining, using the reinforcement learning system, whether the set of routes correspond to a set of trained routes from among the plurality of trained routes;

performing, using the reinforcement learning system, a corrective action in response to the set of routes not corresponding to the set of trained routes, wherein the corrective action includes updating the set of routes to generate a new set of trained routes; and controlling, using the reinforcement learning system, an autonomous movement of the set of pallets based on a real-time comparison between the new set of routes and the plurality of trained routes to prevent bottlenecks in the environment.

13. The system of claim 12, wherein the plurality of difference values corresponds to a difference between a third number of the plurality of pallets at a first routing control location from among the plurality of routing control locations and a fourth number of the plurality of pallets at a second routing control location from among the plurality of routing control locations.

14. The system of claim 12, wherein performing the corrective action includes broadcasting a notification indicating that a manufacturing routine that utilizes the set of routes for pallet movement does not satisfy a time criterion.

15. The system of claim 12, wherein the corrective action includes performing a reinforcement training routine configured to selectively adjust one or more reinforcement parameters of the digital twin.

16. The system of claim 15, wherein selectively adjusting the one or more reinforcement parameters includes adjusting a sensor layout of a plurality of virtual sensors corresponding to the plurality of sensors, adjusting the transient objective function, adjusting the steady state objective function, or a combination thereof.

17. A method comprising:

obtaining sensor data from a plurality of sensors disposed at a plurality of routing control locations of an environment, wherein the sensor data is indicative of a number of a plurality of pallets at the plurality of routing control locations;

calculating a plurality of difference values based on the sensor data;

calculating a transient production value based on the sensor data and a transient objective function;

calculating a steady state production value based on the sensor data and a steady state objective function, wherein the transient objective function and the steady state objective function are based on a first target production value and a second target production value, wherein the first target production value is a first number of a first type of pallets from among the plurality of pallets that traverse between two locations of the environment to satisfy a constraint, and the second target production value is a second number of a second type of pallets from among the plurality of pallets that traverse between the two locations to satisfy the constraint;

generating a state vector by combining the plurality of difference values, the transient production value, and the steady state production value into a unified vector representation that is used by a reinforcement learning system to select actions that optimize both transient and steady-state manufacturing objectives simultaneously based on the plurality of difference values, the transient production value, and the steady state production value;

determining an action at each routing control location from among the plurality of routing control locations based on the state vector, wherein the action includes one of a pallet merging operation and a pallet splitting operation;

defining, using the reinforcement learning system including a neural network, wherein the neural network comprises a dueling network architecture that separately learns state values and action advantages, a set of routes for a set of pallets from among the plurality of pallets based on the action at each routing control location and a digital twin of the environment, wherein the digital twin performs discrete event simulation synchronized with real-time sensor data to generate virtual event traces for training, wherein the digital twin of the environment includes a plurality of trained routes for controlling movement of the plurality of pallets;

determining, using the reinforcement learning system, whether the set of routes correspond to a set of trained routes from among the plurality of trained routes;

performing, using the reinforcement learning system, a corrective action in response to the set of routes not corresponding to the set of trained routes, wherein the corrective action includes updating the set of routes to generate a new set of trained routes; and controlling, using the reinforcement learning system, an autonomous movement of the set of pallets based on a real-time comparison between the new set of routes and the plurality of trained routes to prevent bottlenecks in the environment.

18. The method of claim 17, wherein performing the corrective action includes broadcasting a notification indicating that a manufacturing routine corresponding to the set of routes does not satisfy a time criteria.

19. The method of claim 17, wherein performing the corrective action includes broadcasting a notification indicating that a manufacturing routine that utilizes the set of routes for pallet movement does not satisfy a time criterion.

20. The method of claim 17, wherein the plurality of difference values correspond to a difference between a third number of the plurality of pallets at a first routing control location from among the plurality of routing control locations and a fourth number of the plurality of pallets at a second routing control location from among the plurality of routing control locations.

* * * * *